United States Patent Office 2,791,513
Patented May 7, 1957

2,791,513
AZO PIGMENT

Alfred Siegel, Summit, and Milton Fytelson, Maplewood, N. J., assignors to E. I. du Pont de Nemours & Company, Wilmington, Del., a corporation of Delaware No Drawing. Application July 23, 1953,
Serial No. 369,965

5 Claims. (Cl. 106—289)

This invention relates to the manufacture of improved maroon pigments particularly useful for the preparation of desirable coating compositions, especially automotive enamels.

In the copending application of Killian and Reidinger, Serial No. 159,876 (now U. S. Patent 2,649,383, dated August 18, 1953), a new red-to-maroon pigment comprising the manganese salt of the azo dyestuff obtained by coupling diazotized 4-chloro-2-amino benzoic acid with 3-hydroxy-2-naphthoic acid is disclosed and claimed. This pigment possesses certain highly useful properties, including a desirable red-to-maroon color and excellent durability when formulated into a coating composition and exposed to the elements. In addition, it exhibits a high degree of transparency which results in a desirable "two-tone" or flash when formulated with aluminum flake in an automotive finish.

In spite of these desirable properties which have led to a substantial use of the pigment, it has exhibited two deficiencies which have deterred its general use in automotive finishes which are not used immediately after their preparation, and particularly when the finishes are designed to be sold over the counter as refinish goods. In some vehicles, particularly in the short oil baking enamels containing amine type resins such as urea-formaldehyde and/or melamine-formaldehyde resins, the pigment exhibits a tendency toward reactivity. By this is meant the phenomenon of a progressive and marked increase in apparent viscosity with time of storage so that, in many cases, the composition sets up to a gel structure which no longer has utility as a coating composition. This increase in viscosity may be apparent in as short a time as one day standing at room temperature and may become serious in from one to two weeks, with the composition becoming quite unusable in three to four weeks.

The second deficiency comprises a marked sensitivity to small amounts of water when the pigment is employed in nitrocellulose lacquer compositions. In such instances, a color change takes place which makes the composition no longer useful for its intended purpose.

While these deficiencies can be minimized by the normal formulation practices of the coating composition industry, they require special attention and a principal object of the invention is to effectively overcome these deficiencies and provide a novel and desirable pigment composition which is free from these deficiencies and without the problems which their presence induces. A particular object is to provide an improved red-to-maroon pigment which inherently combines the desirable color, durability and transparency of the pigments of said Killian and Reidinger patent with freedom from serious reactivity in coating composition vehicles and a reduced sensitivity to color change in the presence of small amounts of water in the vehicle. Other objects and advantages of the invention will be apparent from the following description.

These and other objects are accomplished in this invention which embodies the discovery that the incorporation of certain metal ions, especially those of copper, nickel and zinc, in the pigment overcomes the deficiencies and disadvantages alluded to above.

In a more specific and preferred embodiment, the invention comprises preparing the manganese compound of the azo dye from diazotized 4-chloro-2-amino benzoic acid coupled with 3-hydroxy-2-naphthoic acid as described in U. S. Patent 2,649,383 to Killian and Reidinger and after-treating said compound with an ammoniacal solution of a copper salt such as copper sulfate at a relatively high temperature, say, from 50° C. to 100° C.

In practically adapting the invention, the maroon pigment comprising the magnanese salt of the dyestuff resulting from the coupling of diazotized 2-amino benzoic acids, substituted in the 4 position, with 2-hydroxy-3-naphthoic acid, and corresponding to the formula

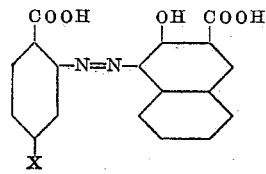

in which X represents a halogen (chlorine, bromine, iodine) or nitro group, can be prepared as disclosed in said U. S. Patent 2,649,383 and through conventional diazotization and laking methods. Thus, such substituted 2-amino-benzoic acid components as 4-chloro-2-amino benzoic acid, or 4-nitro-2-amino benzoic acid, can be diazotized after dissolution in a dilute solution of an alkali, such as sodium hydroxide, through the use of an acid such as hydrochloric acid, and a solution of sodium or other alkali metal nitrite. The resulting diazo can then be coupled with an alkaline solution of 2-hydroxy-3-naphthoic acid, following which the resulting disodium or other alkali metal salt of the dye is isolated by filtration. The dyestuff can then be reacted under slightly acid, substantially neutral, or slightly alkaline conditions with a soluble salt of manganese, such as the sulfate, chloride, acetate, etc. Following the laking operation, the after-treatment contemplated herein can be effected as by adding to the pigment slurry a solution of a soluble salt such as the sulfate of copper, nickel, or zinc, and in amount to provide from about 5 mole percent to 20 mole percent of the after-treating compound in the final pigment. Thereafter, the precipitated pigment is recovered by filtering, washed free from soluble salts, and dried. Such pigment can then be incorporated through milling or otherwise mixed in the presence or absence of suitable modifying agents, with an automotive finish, such as an alkyd resin enamel, modified alkyd resin enamel, phenol formaldehyde resin enamel, resin-modified phenol formaldehyde resin enamel, or other suitable synthetic resin enamels or nitrocellulose or other cellulosic derivative to provide the maroon coating exhibiting the unique properties referred to, with the pigment exhibiting freedom from reactivity in the coating vehicle and reduced sensitivity to color change in the presence of small amounts of water present in such vehicle.

To a clearer understanding of the invention, the following examples are given. These are merely illustrative and are not to be construed as in limitation of the invention:

EXAMPLE I

A pigment of the type contemplated in U. S. Patent 2,649,383 was prepared by dissolving 17.2 parts of 4-chloro-2-amino benzoic acid at 50–60° C. in 250 parts of water containing 4.2 parts of sodium hydroxide. After cooling to 0° C., 7 parts of sodium nitrite dissolved in about 25 parts of cold water was added, followed by 10 parts of hydrochloric acid (100%). The diazo was then clarified.

20 parts of 3-hydroxy-2-naphthoic acid was dissolved at 60° C. in 150 parts of water containing 8 parts of sodium hydroxide. 16 parts of sodium carbonate dissolved in 75 parts of warm water was then added and the mixture adjusted with ice to 10° C. at a volume equivalent to about 600 parts of water. The diazo solution was then added in about 30 minutes, and the resulting dyestuff formed was filtered off and washed with a 5% solution of sodium chloride until nearly free of alkali.

The isolated sodium salt of the dyestuff was re-slurried in 2500 parts of water. To the suspension were added, in turn, 3.6 parts of Para Soap dispersed in 20 parts of water, 7.5 parts of sodium acetate ($NaC_2H_3O_2 \cdot 3H_2O$) dissolved in 25 parts of water, and 25 parts of manganese sulfate (100%) dissolved in 165 parts of warm water, followed by 1.8 parts of sodium hydroxide (100%) dissolved in 20 parts of water. The slurry was then heated to the boil and boiled for 2 minutes, after which the pigment was filtered, washed, dried and pulverized.

The resulting pigment (identified as pigment #1 in the table below) was a deep intense maroon capable of yielding a relatively transparent film when dispersed in a coating composition and yielding good color stability on exposure to sunlight.

A pigment of this invention was prepared by repeating the foregoing steps through the final development at the boil. At this point the slurry was cooled to 70–75° C. by dilution with cold water and there was then added a solution of 2.5 parts of $CuSO_4 \cdot 5H_2O$ dissolved in 24.2 parts of aqueous ammonia (28%). The slurry was stirred for 30 minutes at about 70° C. and the pigment filtered, washed free of soluble salts, and dried.

The resulting dry pigment (referred to as pigment #2 in the table below) exhibited substantially the same color and durability as pigment #1, but the reactivity when dispersed in coating composition vehicles was markedly reduced as shown in said table.

EXAMPLE II

The procedure for preparing a pigment of this invention as outlined in Example I was repeated, except that a solution of 2.38 parts of $NiCl_2 \cdot 6H_2O$ in 34.2 parts of aqueous ammonia (28%) was used instead of the copper sulfate solution in ammonia. The resulting pigment is identified as pigment #3 in the table below.

EXAMPLE III

The process of Example I for preparing a pigment of this invention was repeated, except that the solution of magnanese sulfate used to precipitate the dye was replaced by a mixture of 2.5 parts $CuSO_4 \cdot 5H_2O$ and 25 parts of manganese sulfate (100%) dissolved in 165 parts of water. The pigment product, markedly reduced in reactivity, is denominated pigment #4 in the table below.

EXAMPLE IV

Results similar to those of Example III were obtained by repeating said example but using a mixture of 2.5 parts of $CuSO_4 \cdot 5H_2O$, 25 parts of manganese sulfate (100%) and 24.2 parts of aqueous ammonia (28%) in 165 parts of water. The pigment of this example is designated pigment #5 in the table below.

EXAMPLE V

The isolated sodium salt of the azo dyestuff prepared as in the first two paragraphs of Example I was re-slurried in 2500 parts of water. To the suspension were added, in turn, 3.6 parts of Para Soap dispersed in 20 parts of water, 7.5 parts of sodium acetate ($NaC_2H_3O_2 \cdot 3H_2O$)

dissolved in 25 parts of water and 31.2 parts copper sulfate ($CuSO_4 \cdot 5H_2O$) dissolved in 150 parts of water followed by 4.8 parts of sodium hydroxide (100%) dissolved in 50 parts of water. The slurry was then heated to the boil and boiled for 2 minutes, after which the pigment was filtered, washed, dried and pulverized.

The resulting pigment (designated pigment #6 in the table below) yielded a maroon enamel when dispersed in a coating composition vehicle but the color was not attractive as a self color. Furthermore, enamels made therefrom showed the same tendency to reactivity as found with the manganese salts of Example I.

EXAMPLE VI 90 parts of the manganese pigment of Example I and 10 parts of the copper pigment of Example V were blended in dry form to give a mixed pigment (referred to as pigment #7 in the table below). This pigment exhibited substantially the same properties of reduced reactivity as pigment #2. The proportions of these two pigments can be varied using as little as 5% of the copper pigment of Example V to as much as 20% without materially altering the reactivity.

To test the pigment products made in accordance with each of the above examples, alkyd resin coating compositions having the following composition and containing each pigment were prepared by ball milling a portion of the alkyd resin solution and solvents with the appropriate pigment and then effecting admixture of the remaining ingredients with the resulting composition at a later stage:

| | Percent |
|---|---|
| Pigment | 6.1 |
| Alkyd resin solution (50% solids) (Short oil modified baking alkyd) | 61.0 |
| Urea-formaldehyde resin solution (50% solids) (Uformite F-200-E—Rohm & Haas) | 10.7 |
| Petroleum spirits | 3.0 |
| Xylol | 15.7 |
| Butanol | 3.3 |
| Manganese naphthenate drier solution (6%) | 0.2 |
| | 100.0 |

The enamels so prepared were tested for viscosity immediately after preparation and also after shell storage at normal room temperature for various periods ranging from 1 day to 4 weeks. Viscosity measurements reported in the table below were made by the Ford cup method using a No. 4 orifice. A Ford cup is an efflux type viscosity cup in which the measurements are recorded as the number of seconds required for the fluid in the standardized cup to drain through a standardized orifice at a specified temperature (usually 77° F.). This well-known instrument and its operation are described in a paper entitled "Standardization of the Ford viscosity cup," Official Digest of Federation of Paint and Varnish Production Clubs, November 1949, pp. 831–837.

The following summarizes the viscosity measurements by this method on the enamels of the various pigments of the above examples, the larger numbers representing higher viscosities. When the viscosity is sufficiently high, there may be substantially no flow from the orifice.

Table

| Pigment No. | Initial | 1 day | 1 week | 2 weeks | 3 weeks | 4 weeks |
|---|---|---|---|---|---|---|
| 1 | 33 | 44 | 78 | 94 | 175 | Heavy |
| 2 | 27 | 43 | 47 | 49 | 51 | 49 |
| 3 | 25 | 30 | 41 | 42 | 51 | 56 |
| 4 | 30 | 39 | 43 | 48 | 46 | 49 |
| 5 | 24 | 35 | 38 | 43 | 48 | 50 |
| 6 | 36 | 36 | 48 | 64 | 105 | 174 |
| 7 | 29 | 36 | 40 | 45 | 45 | 53 |

It will be apparent that enamels made from pigments #1 and #6 increased rapidly in viscosity so that after about 2 weeks' storage they would no longer be usable for most purposes. On the contrary, enamels containing the treated pigments of this invention, though showing an initial rise in viscosity, remained in a quite acceptable condition throughout the 4-week testing period. In fact, other tests continuing up to several months indicate that the resistance to excessive increase in viscosity is substantially permanent.

The invention is not dependent upon any particular procedure for the preparation of the azo dye used. The method described is preferred but may readily be modified, as will be obvious to those skilled in the preparation of azo pigments. The dye can be isolated prior to the formation of the heavy metal salt as shown in Example I, but this step is not necessary and the salt may be formed directly from the coupled dye slurry with a suitable adjustment of the pH. Likewise, the conditions of the salt formation may be varied widely, particularly with respect to pH with a consequent variation in the color of the resulting pigment. These results are within the skill of the art as heretofore known but they have not significantly influenced the reactivity of the pigment.

Several methods of obtaining the improved pigment of this invention have been disclosed in the examples. For instance, in Example I, the copper compound is added after the formation of the manganese salt. Obviously, coprecipitation of the copper or other metal compound with the manganese compound can be resorted to, if desired. Examples III and IV show co-precipitation both in the absence and in the presence of excess aqueous ammonia. Example V illustrates a dry mixing operation with a separately prepared copper salt. It is apparent that an intimate admixture of the copper and manganese salts of the azo dye in question provides the unexpected results of this invention. Alkali or alkaline media other than NH3, including sodium or potassium hydroxides or carbonates, etc., can be used or not, as desired, in conjunction with the bivalent metal salt complexing or treating agents herein contemplated. Similarly, while specific temperatures are indicated as preferred for use, these can be varied to higher or lower temperatures. Whether there is an actual chemical combination in which both manganese and copper react with the same dye molecule in the preferred procedure of Example I cannot be presently stated with certainty.

The amount of the copper or other metal salt compound treating agent preferred for use is about 10 mole percent. However, this can be varied widely without materially changing the resistance to reactivity. Thus, as little as 5 mole percent can be used successfully, as can much larger amounts, even up to about 90%, to give products exhibiting the desirable freedom from reactivity. Since there is no marked advantage in the larger amounts and since the tinctorial properties are less desirable, the range of 5 mole percent to 20 mole percent of the total pigments will usually be found to encompass most practical limits.

Although the use of copper as the second metal in addition to manganese is preferred, other divalent metals can be employed to provide the desired effects. In particular, nickel salts have been successfully used, as shown in Example II. Substantially the same limitations apply to their use as with the copper compounds. Zinc compounds have also shown a favorable effect but to a lesser degree than copper. The metals nickel, copper and zinc have consecutive atomic numbers 28, 29 and 30, and all form soluble complexes with NH4OH. Preferably, the sulfates or chlorides of said metals are used, but this is due to convenience and ready availability only. Other soluble salts or mixtures, including the nitrates or acetates of these metals, are equally effective and are also contemplated as useful.

The problem of reactivity of pigments, such as the untreated pigment of Example I, varies markedly with the vehicle in which it is dispersed. It is particularly marked in the case of short oil alkyds which require baking at relatively high (about 225° C. to 350° C.) temperatures for complete drying, and this tendency is further accentuated when to these is also added one of the type of resins (sometimes called amine resins) obtained by condensing urea, or related compounds such as melamine, with formaldehyde and an aliphatic alcohol. These are used with the alkyds to promote hardness in the final film and have become widely accepted as ingredients of high grade automotive enamels, hence the serious need for pigments which are compatible therewith.

The enamel employed in testing the pigments referred to in the above table is typical, but not restrictive of enamels which could be made from the mixed pigments of this invention. Examples of other enamel-type coating compositions in which our novel pigment can be used include those mentioned and disclosed in the aforementioned U. S. Patent 2,649,383 and in U. S. Reissue Patent 21,427 or U. S. Patent 2,225,665. The proportions of ingredients employed in the enamels are critical only insofar as they affect the properties of the dry film and the application thereof. The results of varying these proportions are well known to the paint formulator. Typical short oil alkyd resins adopted for the specific enamel formulation used are well known and include the urea-formaldehyde resins, those similar resins such as based on melamine-formaldehyde-aliphatic alcohol condensations, etc. The choice is again within the skill of the paint formulator and is no part of this invention except that all of these resins in combination with the short oil baking alkyds yield reactive enamels toward which the treated pigments of this invention are particularly substantially non-reactive.

We claim as our invention:

1. A pigmenting composition consisting essentially of an intimate mixture of a manganese salt of the azo dyestuff having the formula

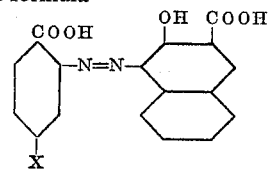

wherein X is a substituent selected from the group consisting of halogen and nitro, and from 5 to 90 mole percent, based on the total pigment, of an insoluble divalent metal salt of said dyestuff selected from the group consisting of copper, nickel and zinc.

2. A pigmenting composition consisting essentially of an intimate mixture of a manganese salt of the azo dyestuff having the formula

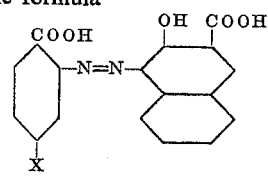

wherein X is a substituent selected from the group consisting of halogen and nitro, and from 5 to 20 mole percent, based on the total pigment, of a divalent insoluble metal salt of said dyestuff selected from the group consisting of copper, nickel and zinc.

3. A new azo maroon pigment composition consisting essentially of an intimate mixture of the manganese salt of the azo dyestuff having the formula

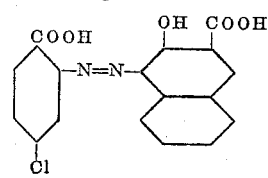

and from 5 to 20 mole percent, based on the total pigment, of an insoluble copper salt of said dyestuff.

4. A new azo maroon pigment composition consisting essentially of an intimate mixture of the manganese salt of the azo dyestuff having the formula:

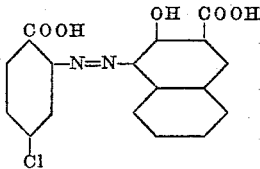

and from 5 to 20 mole perecnt, based on the total pigment, of an insoluble copper salt of said dyestuff.

5. A new azo maroon pigment composition consisting essentially of an intimate mixture of the manganese salt of the azo dyestuff having the formula:

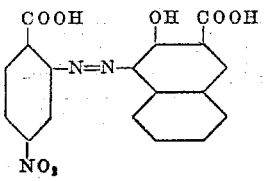

containing from 5 to 20 mole percent, based on the total pigment, of an insoluble copper salt of said dyestuff.

References Cited in the file of this patent

UNITED STATES PATENTS 2,649,383     Killian et al. _____ Aug. 18, 1953